3,794,599

METHOD OF PREPARING A CATALYST OF A GROUP VIII NOBLE METAL AND TIN

Frits M. Dautzenberg, Amsterdam, Netherlands, and Herman W. Kouwenhoven, Houston, Tex., assignors to Shell Oil Company, New York, N.Y.
No Drawing. Filed May 15, 1972, Ser. No. 253,215
Claims priority, application Great Britain, May 21, 1971, 5,186/71
Int. Cl. B01j *11/08*
U.S. Cl. 252—466 PT        8 Claims

ABSTRACT OF THE DISCLOSURE

Catalysts containing Group VIII noble metals and tin on a carrier are prepared by depositing tin on the carrier with an aqueous inorganic salt solution having tin present in the anion.

BACKGROUND OF THE INVENTION

The present invention relates to a process for the preparation of catalysts comprising one or more Group VIII noble metals and tin on a carrier.

The preparation of non-acid catalysts comprising one or more Group VIII noble metals and tin on alumina as a carrier, as well as the use of these catalysts for the dehydrocyclization of hydrocarbons has been described in the German patent application No. 2,038,791. In order to prevent imparting acidity to the catalyst during the preparation of the catalysts the compounds of the noble metals and of tin, which are used for the loading of the alumina, should, according to said patent application, be chosen such that after calcination they leave no acid group or acid residue in the alumina carrier. With respect to the tin compounds which may be used for the preparation of the non-acid catalysts in said patent application a preference is expressed for tin tartrate, which compound is accordingly used for this purpose in most of the examples of the patent application. Apart from the limited commercial availability and poor solubility in water of tin tartrate, there are an additional number of disadvantages to the use of this compound for the preparation of catalysts comprising one or more Group VIII noble metals and tin on a carrier. These disadvantages, some of which have been mentioned already in said patent application, can be summarized as follows.

(1) If the catalyst preparation is made of a carrier material with a particle size greater than 0.5 mm., for instance, with a particle size of 1.5 mm., catalysts with a low activity are obtained.

(2) If in the catalyst preparation first tin and subsequently a Group VIII noble metal are deposited on the carrier, catalysts with a low stability are obtained.

(3) After regeneration, catalysts prepared using tin tartrate show a lower initial activity than the fresh catalyst, this initial activity decreasing each time the catalyst has been regenerated.

It has now been discovered that the above-mentioned disadvantages, which are inherent in the use of tin tartrate, can be avoided if, in the preparation of the catalyst the tin compound is not tin tartrate, but an inorganic salt wherein tin is present in the anion.

SUMMARY OF THE INVENTION

Superior catalysts containing Group VIII noble metals, particularly platinum, and tin on a carrier are prepared by depositing tin on the carrier with an aqueous inorganic salt solution having tin present in the anion, preferably as a stannate. Alumina having a specific surface area of at least 100 m.$^2$/g. and an average pore diameter of at least 70 A. is a preferred carrier.

DETAILED DESCRIPTION OF THE INVENTION

The present invention relates to a process for the preparation of catalyst comprising one or more Group VIII noble metals and tin on a carrier, tin being deposited on the carrier using an inorganic salt wherein tin is present in the anion.

Catalysts prepared according to the invention have a high activity and stability and are very well regenerable.

In the preparation it is very well possible to start from a carrier material with a particle size greater than 0.5 mm. and to deposit on the carrier first the tin and subsequently the noble metal.

Catalysts according to the invention are very suitable for use in various hydrocarbon conversion processes such as isomerization, hydroisomerization, hydrogenation, dehydrogenation, alkylation, dealkylation, cyclization, dehydrocyclization, cracking, hydrocracking and reforming.

In the catalyst preparation according to the invention the inorganic salt wherein tin is present in the anion is preferably a stannate. For the present purpose sodium stannate is particularly preferred as this compound has a very good solubility in water and, moreover, is commercially available in amply sufficient quantities.

Deposition of the metals on the carrier is preferably carried out by impregnating the carrier with one or more aqueous solutions of decomposable compounds of the relevant metals. The metals may be deposited on the carrier simultaneously by impregnating the latter with an aqueous solution comprising both a tin compound and one or more noble metal compounds, or the metals may be deposited on the carrier separately by impregnating the latter with an aqueous solution of a tin compound, preceded or followed by impregnation of the carrier with an aqueous solution, comprising one or more noble metal compounds.

The activity of the present catalysts is governed to a considerable extent by the degree of dispersion of the metal components on the carrier. According as this degree of dispersion is higher, the catalysts have a higher activity. A very high degree of dispersion of the tin component on the carrier, can, for instance, be obtained as follows. The carrier is impregnated with an aqueous solution of an inorganic salt wherein tin is present in the anion and subsequently tin is precipitated from the solution present in the pores of the carrier or on the carrier in the form of tin oxide hydrate. This precipitation may be effected by lowering the pH of the impregnated carrier, for instance, by treating it with a dilute acid. Dilute acetic acid has been found very suitable for this purpose. Precipitation of tin from the tin-containing solution present in the pores of the carrier may also be effected by heating the impregnated carrier in a $CO_2$-containing atmosphere. In order to avoid adsorption of the tin compound on the outer surface of the carrier a polyvalent alcohol is preferably added to the tin-containing impregnating liquid. Sorbitol has been found very suitable to avoid adsorption of the tin compound on the outer surface of the carrier. A very high degree of dispersion of the tin component on the carrier may also be obtained by impregnating the carrier with a water-soluble aluminum compound, simultaneously with or prior to the impregnation of the carrier with an aqueous solution of an inorganic salt wherein tin is present in the anion. For this purpose an aluminate, more preferably sodium aluminate, is very suitable. Preferably, the carrier is simultaneously impregnated with the tin compound and with the aluminum compound.

After the metal compounds have been deposited, the carrier is usually dried at an elevated temperature and subsequently calcined. The calcination is usually carried out in an oxygen-containing gas, preferably air. The calcination temperature preferably does not exceed 550°

C., as it has been found that in most cases above this temperature sintering of the Group VIII noble metals occurs. The calcination is carried out at a temperature above 300° C. and preferably at a temperature between 400 and 500° C. For certain types of catalyst prepared according to the invention, for instance those prepared with the aid of ammonium compounds, it is very important that the calcination should be carried out very carefully. The most important reaction which takes place during the calcination of fresh catalysts prepared with the aid of ammonium compounds is the removal of ammonia through conversion into nitrogen. Since this reaction, which is catalyzed by Group VIII noble metals, is highly exothermal, there is a fairly great risk that, unless special precautions are taken, the temperature of the catalyst will rise locally to above 550° C. As already mentioned in the foregoing, this may lead to damage to the finished catalyst. This risk can be avoided by starting the calcination of these materials at a fairly low temperature and raising the calcination temperature gradually or stepwise as the calcination proceeds. After its last calcination the material is heated in a hydrogen-containing gas, after which it is ready to be used as a catalyst. The heating of the material in a hydrogen-containing gas is carried out at a temperature above 300° C. and preferably at a temperature between 400 and 525° C.

Catalysts prepared according to the invention comprise one or more Group VIII noble metals and tin on a carrier. The Group VIII noble metals that may be present on the carrier material, are platinum, palladium, rhodium, ruthenium, iridium and osmium, preference being given to platinum. Combinations of two or more of these metals may be present as well. The quantity of Group VIII noble metals present in the ready catalysts is from 0.01 to 3% wt., and more preferably from 0.1 to 1% wt. The quantity of tin present in the ready catalysts preferably is from 0.01 to 5% wt., and more preferably from 0.05 to 2% wt. Further, it is preferred that the atomic ratio of tin to the Group VIII noble metals is between 0.1 and 2, and more preferably, that this atomic ratio is not higher than 1. Besides one or more Group VIII noble metals and tin the catalysts may comprise other metals, if desired.

The carrier for the Group VIII noble metals and tin may be amorphous or crystalline. Examples of suitable carriers are silica, alumina, zirconia, thoria, magnesia and boria, as well as mixtures thereof, such as silica-alumina and silica-zirconia. Other suitable carriers are zeolites such as mordenite, faujasite and zeolite-omega. It is also possible to use mixtures of, for example, alumina and mordenite. The preferred carrier for the present catalysts is alumina. The carrier preferably has a specific surface area of at least 100 m.²/g. Catalysts comprising one or more Group VIII noble metals and tin on a carrier with a specific surface area lower than 100 m.²/g., for example on a carrier with a specific surface area of about 50 m.²/g., when used in hydrocarbon conversion processes, often show considerably less attractive catalytic properties than catalysts with the same metal load, but with a carrier having a specific surface area higher than 100 m.²/g. However, on the basis of such carrier materials having a specific surface area lower than 100 m.²/g., it is nevertheless possible to prepare catalysts which have catalytic properties comparable to those of catalysts with an identical metal load, but with a carrier having a specific surface area higher than 100 m.²/g., if this carrier is impregnated with a water-soluble aluminum compound, simultaneously with or prior to the deposition on the carrier of the catalytically active metal components. For this purpose an aluminate, in particular sodium aluminate, is very suitable. The impregnation of the carrier particles having a low specific area with the water-soluble aluminum compound simultaneously with or prior to the deposition of tin on the carrier, has the additional effect that a very high degree of dispersion of the tin component on the carrier is obtained. In the preparation of catalysts according to the invention it is preferred to use carrier materials with an average pore diameter of at least 70 A. and particularly, of more than 150 A.

The size of the carrier particles which are loaded with the metal compounds influences the performance of the catalyst in a hydrocarbon conversion process. A catalyst where the metal compounds are deposited on carrier particles having a particle size of not more than 0.5 mm., for instance of 0.2 mm., generally shows a higher activity than a catalyst which has an identical metal load, but in the preparation of which metal compounds have been deposited on carrier particles having a particle size larger than 0.5 mm., for instance 1.5 mm. In this connection the carrier materials used for the present catalyst preparation preferably have a particle size of not more than 0.5 mm. and, in particular a particle size of not more than 0.25 mm. For use in a fixed-bed process catalyst particles with a particle size smaller than 0.5 mm. are generally too small. For use in a fixed-bed process it is therefore preferred to form catalyst particles having a particle size smaller than 0.5 mm. into larger particles. Any one of the known techniques for the preparation of formed catalyst particles, for example extrudation or pelletization, may be used for this purpose.

Catalysts comprising one or more Group VIII noble metals and tin on a carrier may be acid or not. For some hydrocarbon conversion processes, such as reforming, acid catalysts are preferred. Other hydrocarbon conversion processes, such as dehydrocyclization, are preferably carried out in the presence of non-acid catalysts. The process according to the invention is suitable for the preparation of both acid and non-acid catalysts.

The preparation of acid catalysts according to the invention may be carried out by depositing the metals on an acid carrier, for example, acid alumina. These catalysts may be activated by adding halides, such as fluorides or chlorides. The halide content of these catalysts is preferably from 0.1 to 3% w. and in particular from 0.2 to 2% w., based on the total catalyst composition. The halides may be incorporated in the catalyst at any suitable stage of the catalyst preparation, for example prior to, or following the incorporation of the Group VIII noble metals and tin. A small amount of halide is often incorporated in the carrier when the latter is being impregnated with a Group VIII noble metal. For example, impregnation with chloroplatinic acid normally results in chloride being taken up in the carrier.

The preparation of non-acid catalysts according to the invention may be carried out by depositing the metals on a non-acid carrier, in which case use should be made of metal compounds which leave no acid group or acid residue in the carrier upon calcination of the catalyst. To ensure that the carrier for these non-acid catalysts is completely free of acid, it may be steamed at elevated temperature and/or be neutralized with an alkaline metal or alkaline earth metal carbonate or hydroxide.

Catalysts deposited on a carrier and comprising one or more Group VIII noble metals and tin are of particular importance in connection with the catalytic conversion of hydrocarbons by means of reforming or dehydrocyclization.

Catalytic reforming is a known process in the petroleum industry and is used to increase the octane rating of light hydrocarbon fractions. The feed is usually a naphtha fraction boiling below 290° C. and preferably boiling within the range of 65–230° C. Like catalytic reforming, dehydrocyclization may be used for increasing the octane rating of light hydrocarbon fractions. Dehydrocyclization, however, is especially of importance in connection with the preparation of aromatics from paraffinic hydrocarbons. The feed is preferably a hydrocarbon fraction comprising paraffinic hydrocarbons with 6 to 10 carbon atoms in the molecule. Reforming as well as dehydrocyclization operations may be carried out at a temperature between 400 and 600° C. and space velocities between 0.5 and 10 kg. of feed per kg. of catalyst per hour. These processes are preferably carried out at a temperature between 450 and 550° C. and a space velocity between 1 and 5 kg. of feed per kg. of catalyst per hour. Reforming may be carried out at a pressure between 10 and 50 kg./cm.$^2$ and preferably at a pressure between 18 and 30 kg./cm.$^2$. The molar hydrogen/feed ratio is preferably between 5 and 15. Dehydrocyclization may be carried out at a pressure between 1 and 10 kg./cm.$^2$ and preferably at a pressure between 2 and 5 kg./cm.$^2$. The molar hydrogen/feed ratio is preferably between 0.5 and 5.

The following examples will illustrate the invention. In these examples Catalysts 1–5 were prepared according to the invention, and Catalysts A–F were not so prepared. The latter have been included for comparison.

EXAMPLE I

A commercially available halide-containing alumina having a particle size of 1.5 mm. was steamed with a mixture of steam and air for 24 hours at 475° C. in order to remove the halide, and was subsequently calcined for 3 hours at 850° C. The steamed alumina was further neutralized by impregnation with an aqueous solution of sodium carbonate. The impregnated material was dried at 120° C. and subsequently calcined for 3 hours at 500° C. From this calcined material three catalysts (Catalysts A, B, and C) were prepared as follows:

Catalyst A 25 g. of the alumina treated as described above was impregnated with an aqueous solution comprising both a platinum and a tin compound. The solution was obtained as follows: 0.7 g. of tin oxide hydrate (comprising 18.9% w. Sn) was dissolved in a mixture of 1.3 g. of tartaric acid and 6.3 g. of triethanolamine, after which 0.42 g. of an aqueous solution of platinum tetramine hydroxide (containing 5.87% w. Pt) was added to the mixture; the total volume of the eventually obtained solution was subsequently increased to 25 ml. by the addition of water. After impregnation with the above-mentioned solution, the alumina was dried at 120° C. and subsequently calcined for 3 hours at 500° C. The finished catalyst (Catalyst A) comprised 1 p.b.w. of platinum and 0.6 p.b.w. of tin per 100 p.b.w. of alumina.

Catalysts B and C

The preparation of these catalysts was started from the same steamed and neutralized alumina as had been used for the preparation of Catalyst A. The material, however was previously ground to a particle size of 0.2 mm. Of this ground alumina, 175 g. was impregnated with an aqueous solution comprising both platinum and tin. The solution was obtained as follows: 10.972 g. of tin oxide hydrate (containing 9.57% w. Sn) was dissolved in a mixture of 5.25 g. of tartaric acid and 17.5 g. of triethanolamine, after which 82.55 ml. of an aqueous platinumtetramine hydroxide solution (containing 212 mg. Pt/ml.) was added to the mixture, and the total volume of the eventually obtained solution was subsequently increased to 270 ml. by the addition of water. After impregnation with the above-mentioned solution, the alumina was dried at 120° C. and subsequently compressed to particles of 0.5 to 1.0 mm. (Catalysts B and C, respectively). Finally these particles were calcined for 3 hours at 500° C. The finished catalysts comprise 1 p.b.w. of platinum and 0.6 p.b.w. of tin per 100 p.b.w. of alumina.

Catalyst 1

The preparation of this catalyst was started from the same commercially available, halide-containing alumina, having a particle size of 1.5 mm. as had been used for the preparation of Catalysts A, B and C. As with the preparation of Catalysts A, B and C, the material was steamed for 24 hours at 475° C. with a mixture of steam and air, and subsequently calcined for 3 hours at 850° C. Of this alumina 2500 g. was taken up in a solution of sodium stannate which had been obtained by adding 23 g. of sodium stannate to 500 g. of a 70% sorbitol solution in water and subsequently increasing the volume of the solution to 4500 ml. by the addition of water. After one hour the liquid that had not been absorbed by the alumina, was poured off and the impregnated alumina was taken up in 1750 ml. of 2 N acetic acid. After 30 minutes the acetic acid was poured off and the material was subsequently washed with 17.5 liters of water, dried at 120° C. and calcined for 3 hours at 500° C. The material thus obtained was subsequently impregnated with a platinum-tetramine hydroxide solution which had been obtained by diluting 417 ml. of an aqueous platinumtetramine hydroxide solution (containing 60 mg. Pt/ml.) with water to a total volume of 2750 ml. After the impregnation the material was dried at 120° C. and calcined, first for one hour at 280° C. and subsequently for 3 hours at 500° C. The material thus obtained was finally impregnated with a solution of 28.8 g. of sodium carbonate in 2750 ml. of water. After the impregnation the material was dried at 120° C. and calcined for 3 hours at 500° C. The finished catalyst (Catalyst 1) comprised 1 p.b.w. of platinum and 0.25 p.b.w. of tin per 100 p.b.w. of alumina.

Dehydrocyclization experiments: The Catalysts A, B, C and 1 were tested for their activity and stability in the dehydrocyclization of n-hexane to benzene. These experiments were conducted in an upflow unit, using a fixed bed of the catalyst. The catalysts were first reduced and activated by heating them with hydrogen for about 12 hours at 400° C. at atmospheric pressure, using a space velocity of 3 Nl. gas per gram of catalyst per hour. n-Hexane was dehydrocyclized in the presence of hydrogen at a space velocity of 1 g. of n-hexane·g.$^{-1}$·h.$^{-1}$ and a hydrogen/n-hexane molar ratio of 2. The temperature used was 520° C. and the total pressure amounted to 3 kg./cm.$^2$. The results of the experiments are represented in Table 1.

TABLE 1

| Catalyst | Particle size of the alumina used as starting material, mm. | Particle size of finished catalyst, mm. | Compound used for the deposition of tin on the carrier | Benzene in product, percent wt. | | |
|---|---|---|---|---|---|---|
| | | | | After 2 hours | After 6 hours | After 20 hours |
| A | 1.5 | 1.5 | Tin tartrate | 24.0 | 24.0 | 23.0 |
| B | 0.2 | 0.5 | do | 31.5 | 32.0 | 32.0 |
| C | 0.2 | 1.0 | do | 31.5 | 31.2 | 32.5 |
| 1 | 1.5 | 1.5 | Sodium stannate | 33.5 | 33.5 | 33.2 |

This example shows that if the preparation of catalysts with the use of tin tartrate is started from alumina having a particle size of 1.5 mm., a catalyst having a low activity is obtained. This disadvantage may be obviated by first grinding the alumina particles to a particle size of 0.2 mm. After compression of the finished catalyst material to a particle size of 0.5 or 1.0 mm., catalysts having a high activity are obtained. Catalysts having the same high activity as mentioned hereinbefore may also be prepared from alumina having a particle size of 1.5 mm., (so without grinding and compressing) if for the preparation of the catalyst tin tartrate is replaced by sodium stannate.

EXAMPLE II

Two catalysts (D and 2), each comprising 1 p.b.w. of platinum and 0.6 p.b.w. of tin per 100 p.b.w. of alumina, where prepared by successively impregnating an alumina having a particle size of 0.2 mm. with a solution of a platinum compound and with a solution of a tin compound. For the preparation of Catalyst D the tin compound used was tin tartrate, and for the preparation of Catalyst 2 the tin compound used was sodium stannate. These catalysts were tested for their activity and stability in the dehydrocyclization of n-hexane to benzene. The experiments were conducted in the same way as described in Example I. The results of the experiments are represented in Table 2.

TABLE 2

| Catalyst | Compound used for the deposition of tin on the carrier | Benzene in product, percent wt. | | |
|---|---|---|---|---|
| | | After 25 hours | After 50 hours | After 90 hours |
| D | Tin tartrate | 26.5 | 32.6 | 29.4 |
| 2 | Sodium stannate | 39.4 | 38.9 | 38.4 |

This example shows that, when the preparation of catalyst is started from alumina having a particle size of 0.2 mm., a catalyst having a considerably higher activity is obtained if in the preparation of the catalyst tin tartrate is replaced by sodium stannate.

EXAMPLE III

Four catalysts (Catalysts E, F, 3 and 4), each comprising 1 p.b.w. of platinum and 0.6 p.b.w. of tin per 100 p.b.w. of alumina, were prepared by impregnating alumina with a solution of a platinum compound and with a solution of a tin compound. For the preparation of Catalysts E and 3 the alumina was first impregnated with the solution of the platinum compound and subsequently with the solution of the tin compound. In the preparation of Catalysts F and 4 the alumina was first impregnated with the solution of the tin compound and subsequently with the solution of the platinum compound. For the preparation of Catalysts E and F the tin compound used was tin tartrate and for the preparation of Catalysts 3 and 4 the tin compound used was sodium stannate. Furthermore, a fifth catalyst (G) was prepared, starting from the same alumina comprising 1 p.b.w. of platinum per 100 p.b.w. of alumina and no tin.

These catalysts were tested for their activity and stability in the dehydrocyclization of n-hexane to benzene. The experiments were conducted in the same as described in Example I.

The results of the experiments are represented in Table 3.

TABLE 3

| Catalyst | Compound used for the deposition of tin on the carrier | Sequence in which the metals are deposited on the carrier | Benzene in product, percent wt. | |
|---|---|---|---|---|
| | | | After 3 hours | After 20 hours |
| E | Tin tartrate | 1, Pt; 2, Sn | 24.4 | 24.0 |
| F | do | 1, Sn; 2, Pt | 23.8 | 14.9 |
| G | | | 33.1 | 15.6 |
| 3 | Sodium stannate | 1, Pt; 2, Sn | 36.0 | 38.9 |
| 4 | do | 1, Sn; 2, Pt | 38.5 | 39.2 |

This example shows the favorable influence of tin on the stability of the catalyst. When for the preparation of the catalyst the tin compound is tin tartrate, this favorable influence occurs only if first platinum and subsequently tin has been deposited on the carrier. When the tin compound used is sodium stannate, the favorable influence of tin on the stability of the catalyst is independent of the sequence in which the metals are deposited on the carrier.

EXAMPLE IV

The regenerability of Catalysts A and 4 was tested as follows. The catalysts were subjected to a series of repeated 200-hour dehydrocyclization experiments under the same conditions as described in Example I. After each dehydrocyclization experiment the spent catalyst was subjected to a regeneration comprising heating the catalyst at 350–380° C. in a mixture of oxygen and nitrogen containing 0.5% v. of oxygen, subsequently heating it in air at 400° C., and finally heating it in hydrogen at 400° C.

After 10 regenerations the initial activity of Catalyst A had decreased to about 60% of that of the fresh catalyst. The initial activity of Catalyst 4 after 10 regenerations remained on the same high level as that of the fresh catalyst.

These results demonstrate the superior regenerability of catalysts prepared using as tin compound sodium stannate.

EXAMPLE V

A Catalyst 5 was prepared, starting from an alumina having a specific surface area of 48 m.$^2$/g. Of this alumina 100 g. was impregnated with a solution of 2.7 g. of sodium stannate and 1.2 g. of sodium aluminate in 35 ml. of water. The impregnated material was dried at 120° C., calcined for 3 hours at 500° C., washed with 350 ml. of water in order to remove the excess sodium and once more dried at 120° C. and calcined for 3 hours at 500° C. Of the calcined material 41 g. was impregnated with a platinum-tetramine hydroxide solution which had been prepared by diluting 13.7 ml. of an aqueous platinumtetramine hydroxide solution (containing 300 mg. Pt/ml.) to 30 ml. After drying at 120° C. and calcining for 3 hours at 500° C. the catalyst was tested for stability and selectivity in the dehydrocyclization of n-hexane to benzene. The catalyst was tested both in the freshly prepared condition and after 25 regenerations. The experiments were conducted in the same way as described in Example I. The results of the experiments are represented in Table 4.

TABLE 4

| Product composition | Fresh catalyst, percent wt. | | Regenerated catalyst after 25 regenerations, percent wt. | |
|---|---|---|---|---|
| | After 5 hours | After 15 hours | After 5 hours | After 15 hours |
| $C_1$-$C_5$ | 5.1 | 5.0 | 5.1 | 5.0 |
| i-$C_6$ | 3.9 | 3.2 | 2.4 | 2.1 |
| n-$C_6$ | 65.5 | 66.7 | 69.2 | 70.4 |
| Methylcyclopentane | 3.0 | 2.6 | 1.6 | 1.3 |
| Benzene | 22.5 | 22.5 | 21.7 | 21.2 |
| Selectivity (benzene formed/n-hexane converted) | 65.2 | 67.6 | 70.5 | 71.6 |

This example shows that, when the preparation of the catalyst is started from an alumina having a low specific area, it is nevertheless possible to obtain a catalyst having a high stability and a high selectivity to benzene, which catalyst, moreover, is well regenerable if in the preparation of the catalyst the alumina is impregnated with sodium aluminate.

What is claimed is:

1. A process for the preparation of catalysts comprising one or more Group VIII noble metals and tin on a carrier, wherein tin is deposited on the carrier from an aqueous inorganic salt solution having tin present as sodium stannate.

2. The process of claim 1 wherein tin is deposited by impregnating the carrier and by subsequently precipitating tin present in the pores of the carrier, in the form of tin oxide hydrate.

3. The process of claim 2 in which the precipitation is effected by treating the impregnation carrier with dilute acetic acid.

4. The process of claim 1 wherein a polyvalent alcohol has been added to the tin-containing impregnating liquid.

5. The process of claim 1 wherein the carrier is alumina having a surface area smaller than 100 m.²/g. and simultaneously with or prior to depositing tin thereon said alumina is impregnated with sodium aluminate.

6. The process of claim 1 wherein catalysts are prepared which comprise from 0.1 to 1% w. of platinum and from 0.05 to 2% w. of tin.

7. The process of claim 1 wherein the carrier is alumina having a specific surface area of at least 100 m.²/g. and an average pore diameter of at least 70 A.

8. The process of claim 1 wherein the carrier particle size is not more than 0.5 mm. before metal compounds are deposited thereon.

References Cited

UNITED STATES PATENTS

| 3,192,168 | 6/1965 | Grenet | 252—473 |
| 3,641,182 | 2/1972 | Box et al. | 252—466 PT |
| 3,718,578 | 2/1973 | Buss et al. | 252—466 PT |
| 3,317,439 | 5/1967 | Stiles | 252—472 X |
| 3,011,920 | 12/1961 | Shipley | 252—472 X |

DANIEL E. WYMAN, Primary Examiner

W. J. SHINE, Assistant Examiner

U.S. Cl. X.R.

252—472